United States Patent [19]

Anders

[11] Patent Number: 5,472,737
[45] Date of Patent: Dec. 5, 1995

[54] PHOSPHORESCENT HIGHWAY PAINT COMPOSITION

[76] Inventor: Irving Anders, 54 Crossway, Scarsdale, N.Y. 10583

[21] Appl. No.: 257,350

[22] Filed: Jun. 9, 1994

[51] Int. Cl.$^6$ ............... B05D 5/06; C08K 3/30; C08L 75/04; C09K 11/02
[52] U.S. Cl. ............ 427/137; 252/301.36; 427/157; 523/172; 524/420; 524/529
[58] Field of Search .............. 252/301.36; 523/172; 524/420, 589; 427/137, 157

[56] References Cited

U.S. PATENT DOCUMENTS

| | | | |
|---|---|---|---|
| 1,407,534 | 9/1919 | Hering | 252/301.36 |
| 1,637,963 | 8/1927 | Sauvage | 252/301.36 |
| 2,436,182 | 2/1948 | Schmidling | 252/301.36 |
| 3,935,158 | 1/1976 | Watanabe | 524/420 |
| 4,812,492 | 3/1989 | Eckes et al. | 524/420 |
| 5,256,725 | 10/1993 | Eranian et al. | 523/172 |

FOREIGN PATENT DOCUMENTS

| | | | |
|---|---|---|---|
| 0466671 | 1/1992 | European Pat. Off. | 523/172 |
| 2627932 | 12/1977 | Germany | 524/420 |
| 3346915 | 7/1985 | Germany | 524/420 |
| 0001759 | 1/1983 | Japan | 523/172 |
| 0040577 | 2/1989 | Japan | 523/172 |
| 0098669 | 4/1989 | Japan | 523/172 |
| 0169672 | 6/1990 | Japan | 523/172 |
| 0157461 | 7/1991 | Japan | 523/172 |
| 0180605 | 8/1991 | Japan | 523/172 |
| 0180606 | 8/1991 | Japan | 523/172 |
| 2043673 | 10/1980 | United Kingdom | 252/301.36 |

*Primary Examiner*—Peter A. Szekely

[57] ABSTRACT

A water based luminescent highway or roadway paint composition that contains a fine powdered luminescent substance which does not require an organic solvent, a colored paint dispersion, and a polyurethane resin which is water compatible and which imparts an extended surface life under normal traffic conditions. The luminescent substance may be either a phosphorescent material or a combination of a phosphorescent and a fluorescent material. When the fluorescent material is present in the luminescent substance a daytime luminescence or reflectivity or coloration is produced in addition to the phosphorescence produced at night when light (head lights of an automobile) shine on the paint composition marking the median highway stripe or the highway edges.

10 Claims, No Drawings

PHOSPHORESCENT HIGHWAY PAINT COMPOSITION

BACKGROUND OF THE INVENTION

1. Field of the Invention

The present invention relates to water based highway or roadway paints that contain a luminescent substance, which does not require an organic solvent, a colored paint dispersion and a polyurethane resin which is water miscible, and which imparts an extended surface life under normal traffic conditions.

2. Background Art

It is presently desirable to produce luminescent highway paints whose compositions do not require organic solvents whose vapors are undesirable when released to the atmosphere. U.S. Pat. No. 4,172,063 discloses an abrasion resistant reflective marking composition containing cement a fluorescent pigment, silica, glass fibers and a filming bonding acrylic polymer agent. This composition is, however, not environmentally friendly.

The term "luminescence" as used in this specification and in the appended claims is meant to be that property of a material which causes visible light to be continued to be emitted after an exciting light source has been removed as well as that property of a material to glow under a source of light of low visibility and suitable wavelength. U.S. Pat. No. 223,050; 274,415; 1,407,534 and 1,637,963 disclose the use of luminous (phosphorescent) compositions in paint, enamels, and as a coloring on paper. A paint mixture with an acrylic vehicle but having an alkaline earth phosphor other than zinc sulfide which could be modified by replacing its alkaline earth phosphor with zinc sulfide to obtain a preferred phosphorescent paint is described in U.S. Pat. No. 2,436,182. All of these cited references are incorporated in their entirety herein.

As is well-known, fluorescent paints when excited by a source of light produce an emission of light but the light emission is limited to the period of excitation. Such paints can be selected to provide a clay time coloration which will demarcate and emphasize the highway edges and median traffic divider stripes.

Phosphorescent paints on the other hand, once they have been excited, remain luminous with a soft, slowly decaying emission or radiation. Such phosphorescent paints can generate a useful level of luminous flux for periods of time (even several hours) when exposed to sunlight or artificial light (such as from headlights of automobiles) in the dark of night. After an initial exposure to a light source, luminescence can be restored by once again exposing the paints to either a natural or an artificial light. Thus, highway paints have incorporated fluorescent or phosphorescent paint to demarcate the edges of highways and the median line of the highway to differentiate the different directions of the highway vehicles. Previously highway paints, due to chemical attack by the atmosphere on the phosphor, lose their capacity to phosphorescence in six to twelve months.

However, it is necessary that a highway paint have the following characteristics such as ease of application, short track time, long wearability and suitable luminescence. Of these, the most difficult to achieve is long wearability under normal traffic conditions.

Accordingly, it is a principal object of the present invention to provide a highway or roadway paint that is environmental protective, luminescent (phosphorescent and/or fluorescent) and has increased roadway life and durability.

Other objects of the present invention, as well as particular features, elements, and advantages thereof, will be elucidated in, or be apparent from, the following description of the invention.

SUMMARY OF THE INVENTION

Now it has been discovered that environmentally friendly highway paints can be produced which have the desired characteristics of ease of application, short track time, suitable luminescence as well as the most desired characteristic of extended service wear time under traffic conditions.

The present invention achieves the above objects, among others, by providing, in a preferred embodiment, a water based highway or roadway paint comprising a luminescent substance such as a phosphorescent powder or a combination of a phosphorescent powder and a fluorescent powder, a colored paint dispersion, and a polyurethane resin which is water compatible and which, after application when the paint composition is dry, imparts a resistance to surface wear by tires of motor vehicles using the roadway and thus provides an extended surface life. This highway or roadway marking paint can be used to provide pavement markings and patterns in accordance with state traffic regulations (eg. New York State, Manual of Uniform Traffic Control devices [MUTCD]). Such paints are used for marking lines in the path of traffic as well as those marking patterns located out of the general path of traffic.

The luminescent substance may be either a phosphorescent substance or a combination of a phosphorescent and a fluorescent substance. However, the luminescent substance must be soluble in water or miscible (compatible) with water. The phosphorescent substance will contain phosphors for example zinc sulfide or an alkaline earth sulfide and is employed in commercially available powder form.

The novel water based luminescent paint composition of the present invention not only protects from erosion, but also shields the phosphor in the paint from the oxidizing action of the atmosphere and from moisture. When the luminescent substance is a combination of a phosphorescent and a fluorescent material, the fluorescent material present in the luminescent substance produces a daytime luminescence or reflectivity or coloration in addition to the phosphorescence produced at night when light (i.e. head lights of an automobile) shine on the paint con, position demarcating the median highway stripe or the highway edges. The operable range for the concentration of phosphorescent base is from about 15% to about 75%, with a preferred range from about 20% to about 75%, with a more preferred range from about 30% to about 70%, and a most preferred from about 30% to 50% by weight of the water based luminescent paint composition.

The water based colored paint dispersions employed in the present invention are commercially produced water based paints containing various colors used in painting highway roadway surfaces including white, yellow, orange, red, blue, and green. These types of paints may for example be used as a highway paint colored with the appropriate highway or roadway colors of such as white (titanium dioxide [ASTM D476, Type II] 100% purity), yellow (medium chrome yellow [ASTM D211, Type III] 100% purity), orange and blue. The water based colored paint dispersion represents from about 5% to about 65%, a preferred range being from about 10% to about 60%, a more preferred range from about 15% to about 55%, and a most preferred being from about 15% to about 40% by weight of the water based luminescent paint composition.

The water based luminescent paints of the present invention also contain a water based polyurethane resin. The water miscible polyurethane resin (eg. an acrylic urethane resin in either a semi-gloss or gloss) used in the highway paint composition is a thermoplastic polymer derived or produced by the reaction of a polyisocyanate such as a diisocyanate (toluene diisocyanate) and a hydroxyl-containing material, for example, a polyol derived from propylene oxide or trichlorobutylene oxide, containing a water soluble group such as hydroxy, carboxylic acid or an fine group. Since it prevents or reduces or minimizes the flaking of the exposed surface by the tires of the motor vehicles using the roadway, this polyurethane resin eliminates the need for an overcoat. The amount of water soluble polyurethane resin (semi-gloss or gloss) used ranges from about 3% to about 40%, with a preferred range from about 5% to about 35%, more preferred from about 5% to about 30%, and a most preferred from about 5% to about 20% by weight of the water based luminescent paint compositions.

The selection of the amount of luminescent substance, colored paint dispersion, and polyurethane resin from within the ranges discussed above, is effected, for example, by the color of the paint dispersion. Yellow paints require increased amounts of luminescent material in comparison to white paints. The selected ranges permit a careful balance of the ingredients of the water based luminescent paint compositions of the invention resulting in a highway paint composition with maximum desirable characteristics for all traffic conditions.

Optionally, a particulate may be used to impart abrasiveness to the paint composition and is either a natural abrasive material such as fine sand, silica, ground marble (white marble preferred), corundum (aluminum oxide, emery), pumice, iron oxide and feldspar. The more important synthetic types are silicon carbide, boron carbide, cerium oxide and fused alumina; or even some reflective substances (for example crushed reflective glass) as long as they will impart an effective abrasiveness to the surface of the dried paint. This abrasiveness reduces the likelihood of skidding by motor vehicles both in clear weather as well as when the surface of the road is wet (for example after a rain). The operable range is an additive amount from about 1% to about 15% parts by weight, with a preferred range of about from 1% to about 13%, with from about 1% to about 9% the most preferred.

The surface of the pavement or roadway is prepared to receive the new paint by being swept clean and then air blasted to remove dirt and other residues thereon.

The applicating equipment for the paint is that which is commonly used to paint roadway surfaces, i.e. it shall be maneuverable to the extent that straight lines can be followed and normal curves can be made in a true arc. Other accessories are utilized which allow for marking legends, symbols, crosswalks, and other special patterns. This equipment is normally truck mounted to provide a self-contained pavement marking machine to apply the paint and other desired reflective materials such as glass spheres in continuous and skip-line patterns. During application of the water based luminescent paint compositions of the present invention, the surface temperature of the roadway should be about 50° F. or higher.

DETAILED DESCRIPTION OF THE PREFERRED EMBODIMENTS

Some examples will be given to illustrate the essence of the invention. All the ingredients are set forth as parts by weight unless otherwise indicated.

EXAMPLE 1

A water based highway paint is produced from the following ingredients:

40 parts of powered phosphorescent base;

50 parts of white water based highway paint;

10 parts of water based acrylic urethane, semi-gloss.

The ingredients are mixed at an ambient temperature 73°±5° F. The minimum temperature of the asphalt pavement surface is 50° F. The paint is then sprayed on the pavement surface of a roadway in four inch stripes. The surface of the roadway has been swept clean and air blasted to remove dirt and other residues in the areas where the paint is to be applied. The paint is allowed to dry until it is no longer tacky to the touch (a no-tack condition) and this usually occurs in about 30 minutes. It is completely dry in about an hour.

EXAMPLE 2

A water based highway paint is produced from the following ingredients:

65 parts of powered phosphorescent base;

22 parts of yellow water based highway paint;

13 parts of water based acrylic urethane, gloss.

The ingredients are mixed at an ambient temperature of 73°±5° F. The minimum temperature of the pavement is 50° F. The paint is then sprayed on the asphalt pavement surface of a roadway in four inch stripes. The surface of the roadway has been swept clean and air blasted to remove dirt and other residues in the areas where the paint is to be applied. The paint is allowed to dry until it is no longer tacky to the touch (a no-tack condition) and this usually occurs in about 30 minutes. It is completely dry in about an hour.

EXAMPLE 3

A water based highway paint is produced from the following ingredients:

40 parts of powered 50/50 phosphorescent/fluorescent base;

50 parts of white water based highway paint;

10 parts of water based acrylic polyurethane, semi-gloss.

The ingredients are mixed at an ambient temperature of 73°±5° F. The minimum temperature of the pavement is 50° F. The paint is then sprayed on the asphalt pavement surface of a roadway in four inch stripes. The surface of the roadway has been swept clean and air blasted to remove dirt and dust and other residues such as oil, grease, and similar foreign materials in the areas where the paint is to be applied. The paint is allowed to dry until it is no longer tacky to the touch (a no-tack condition) and this usually occurs in about 30 minutes. It is completely dry in about an hour.

EXAMPLE 4

A water based highway paint is produced from the following ingredients:

65 parts of powered 50/50 phosphorescent/fluorescent base;

22 parts of yellow water based highway paint;

13 parts of water based acrylic polyurethane, gloss.

The ingredients are mixed at an ambient temperature of 73°±5° F. The minimum temperature of the pavement is 50°

F. The paint is then sprayed on the asphalt pavement surface of a roadway in four inch stripes. The surface of the roadway has been swept clean and air blasted to remove dirt and other residues in the areas where the paint is to be applied. The paint is allowed to dry until it is no longer tacky to the touch (a no-tack condition) and this usually occurs in about 30 minutes. It is completely dry in about an hour.

| Ingredients | Ex. 5* | Ex. 6* | Ex. 7* |
|---|---|---|---|
| sand (fine) | 15 | 5 | 13 |
| phosphorescent base | 15 | 45 | 22 |
| highway paint white | 40 | 40 | 50 |
| acrylic polyurethane | 30 | 10 | 15 |

| Ingredients | Ex. 8* | Ex. 9* | Ex. 10* |
|---|---|---|---|
| sand (fine) | 7 | 9 | 11 |
| phosphorescent base | 38 | 32 | 28 |
| highway paint white | 30 | 37 | 43 |
| acrylic polyurethane | 25 | 22 | 18 |

*All parts of these examples are parts by weight. All ingredients are water compatible or water soluble except for sand.

The ingredients are mixed at an ambient temperature of 73°±5° F. The minimum temperature of the pavement is 50° F. The paint is then sprayed on the asphalt pavement surface of a roadway in four inch stripes. The surface of the roadway has been swept clean and air blasted to remove dirt and other residues in the areas where the paint is to be applied. The paint is allowed to dry until it is no longer tacky to the touch (a no-tack condition) and this usually occurs in about 30 minutes. It is completely dry in about an hour depending upon the moisture content of the ambient air. The higher the moisture content of the air, the longer the paint takes to dry completely.

The dried highway paint of the present invention exhibits greater durability, improved abrasiveness, and the luminescence materials exhibit a longer life by the order of several magnitudes than previously known because the polyurethane resin in the paint composition tends to prevent oxidation of the luminescent materials in the paint. Previously luminescent materials exhibited a useful life of a minimum of three to six months before needing to be replaced. The current effective useful life of luminescent materials in the paint composition of the present invention is a minimum of about a year or longer. The durability of the paint on the roadway is also greatly increased due to the polyurethane resin and the abrasive in the paint reduces the tendency of vehicles driving over the paint to skid.

When it is desirable to have reflectorized highway markings or to increase the reflectivity of the highway paint, reflective glass beads (fine glass spheres) are injected into or dropped onto the on the surface of the wet paint on the roadway surface manually or by a suitable mechanical device (such as a sprinkler) at the rate of 20 to 25 pounds per gallon of thermosetting resin (eg. epoxy resin material). Insufficient glass bead coverage or inadequate glass bead retention are to be avoided. Approximately about ten percent of the reflective beads applied to the painted surface adhere to the wet surface of the paint.

All necessary spray equipment, mixers, compressors and other appurtenances for the placement of the luminescent highway paint or reflectorized highway pavement markings are well known in the prior art.

The reflective glass beads shall be glass spheres for drop-on application and shall have the following characteristics: colorless, clean, transparent, free from milkiness or excessive air bubbles and essentially clean from surface scaring or scratching, spherical in shape and at least 70% shall be true spheres when tested in accordance with ASTM D1155, Procedure A, the refractive index of the spheres shall be minimum of 1.50 as determined by liquid immersion method at 25° C., and the silica content shall no be less than 60%. The glass spheres shall have the following gradation when tested in accordance with ASTM D1214:

| US Standard Sieve | Total Percent Passing |
|---|---|
| Passing #20 | 100 |
| Passing #30 | 80–95 |
| Passing #50 | 9–42 |
| Passing #80 | 0–10 |

When reflectorized pavement markings (such as the yellow and white) are used, the highway paint has a composition as follows:

| Pigment - Amount | Epoxy Resin (Two Component) |
|---|---|
| White - 18–25 | 72–75 |
| Yellow - 23–30 | 77–70 |

(All parts are parts by weight)

The above paint compositions are used in combination with the paint compositions of the preceding examples or are used as reflectorized pavement markings per se. The temperature—ambient and pavement surface—as well as drying time are the same as those set forth in the preceding examples 1–10. The conditions of application and surface preparation are as set forth in the referred to examples. The glass spheres are applied at rate of 20 to 25 pounds per gallon of epoxy resin.

When reflective glass spheres are used with the highway paint of the invention and due to wear are worn off the surface of the paint (since the glass spheres are considered a superficial coating), the reflectivity of the paint is still present because of the luminescent material in the paint which has not been removed and continues to be present until the paint is completely worn away or physically removed.

It will thus be seen that the objects set forth above, among those elucidated in, or made apparent from, the preceding description, are efficiently attained and, since certain changes may be made in the above composition without departing from the scope of the invention, it is intended that all matter contained in the above description shall be interpreted as illustrative only and not in a limiting sense.

While the water based paint composition of the present invention is directed toward application to roadway surfaces, including both roadway pavement writing and markings, it could also be used on overhead road and shoulder signs with a vertical post. In such applications as these an aggregate such as crushed reflective glass or fine white marble would be used in an additive amount in the paint composition to enhance the reflectivity of the paint.

It is also to be understood that the following claims are intended to cover all of the generic and specific features of the invention herein described and all statements of the scope of the invention which, as a matter of language, might be said to fall therebetween.

I claim:

1. In an improved method of marking a surface for alerting or directing traffic with a water based paint composition having a colored paint dispersion which when in contact with a light source emits electromagnetic radiation in the visible spectrum wherein the improvement comprises the step of:

enhancing visibility of the marking by applying to said surface the water based paint composition with a powdered luminescent substance comprising at least a phosphorescent substance; and, (b) a polyurethane resin, wherein the resin and the luminescent substance are water miscible for forming a painted marking having enhanced visibility over existing traffic markings by electromagnetic radiation consisting substantially of electromagnetic radiation within the visible spectrum throughout any twenty four hour period, and whereby the marking is environmentally friendly.

2. The method of claim 1 in which the luminescent substance is a combination of said phosphorescent substance and a fluorescent substance and emits both phosphorescent and luminescent electromagnetic radiation.

3. The method of claim 1 in which the paint composition is applied to form a plurality of strips that emit both phosphorescent and fluorescent electromagnetic radiation.

4. The method of claim 1 in which the powdered luminescent substance comprises from about 15% to about 75% by weight, the colored paint dispersion comprises from about 10% to about 65% by weight, and the polyurethane resin comprises from about 3% to about 35% by weight.

5. The method of claim 1 in which the color of the paint dispersion is selected from the group consisting of white, yellow, orange, blue, red, green and combinations thereof.

6. The method of claim 1 in which the colored paint dispersion is present from about 15% to about 55% by weight, the color of the paint dispersion is white, and the luminescent material is present from about 30% to about 50% by weight.

7. The method of claim 1 in which the colored paint dispersion is present from about 15% to about 40% by weight, the color of the paint dispersion is yellow, and the luminescent material is present from about 30% to about 70% by weight.

8. The method of claim 1 in which the paint composition contains in a additive amount a fine abrasive particulate selected flora the group consisting of a natural abrasive material and a synthetic abrasive material.

9. The method of claim 8 in which the natural abrasive material is selected from the group consisting of sand, silica, ground marble, corundum, pumice, iron oxide and feldspar, and mixtures thereof.

10. The method of claim 8 in which the synthetic abrasive material is selected from the group consisting of silicon carbide, boron carbide, cesium carbide and fused alumina, and mixtures thereof.

* * * * *